United States Patent [19]

House

[11] Patent Number: 5,116,501
[45] Date of Patent: May 26, 1992

[54] PADDLEWHEEL AERATOR DRIVE MECHANISM

[75] Inventor: Barry L. House, Wynne, Ark.

[73] Assignee: House Manufacturing, Inc., Cherry Valley, Ark.

[21] Appl. No.: 645,701

[22] Filed: Jan. 25, 1991

[51] Int. Cl.$^5$ .............................................. C02F 7/00
[52] U.S. Cl. ................................ 210/242.2; 261/92; 261/120
[58] Field of Search ............. 210/219, 242.2, 150; 261/92, 120; 440/90

[56] References Cited

U.S. PATENT DOCUMENTS

| | | |
|---|---|---|
| 3,452,873 | 7/1969 | Blough ........................ 261/92 |
| 3,466,241 | 9/1969 | Simpson ....................... 261/92 |
| 3,561,738 | 2/1971 | Galeano ...................... 210/242.2 |
| 3,595,538 | 7/1971 | Baumann ..................... 210/242.2 |
| 4,385,987 | 5/1983 | McGinley et al. ............. 261/92 |
| 4,439,164 | 3/1984 | Daugherty .................... 440/90 |
| 4,908,131 | 3/1990 | Moore ......................... 261/92 |

*Primary Examiner*—Stanley S. Silverman
*Assistant Examiner*—Christopher Upton
*Attorney, Agent, or Firm*—Robert R. Keegan

[57] ABSTRACT

There is disclosed a paddlewheel aerator drive mechanism in an electric motor powered float mounted paddlewheel aerator for fish farms or similar applications, including a rugged lightweight frame with foam flotation elements and a rotatable multi-paddle rotor at least about three feet in diameter with the paddle rotation path extending substantially below the water line. One end of its shaft is secured in the wall of a substantially water tight drive box assembly. Extending into the drive box assembly parallel to and generally opposite the paddlewheel rotor shaft is a shaft of an electric motor, also mounted on the frame. A speed reduction chain drive inside the drive box couples the motor shaft to the paddlewheel rotor shaft and includes at least two conventional drive chains, a small sprocket on the motor shaft, a large sprocket on the paddlewheel rotor shaft, and intermediate large and small sprockets on an intermediate shaft mounted in intermediate shaft bearings on an intermediate bearing take-up pedestal secured inside the chain drive box which has a removable cover with a substantially watertight seal. The arrangement of the chain drive box assembly and the chain drive therein is such that moderate flexing of the overall structure does not strain the chain drive or adversely affect its operation.

10 Claims, 4 Drawing Sheets

PADDLEWHEEL AERATOR DRIVE MECHANISM

The present invention relates generally to mechanisms for infusing air from the atmosphere into large bodies of water, and more particularly to such mechanisms which are powered by a rotary engine or motor and are provided with a large rotating paddlewheel with its paddles extending below the water line thereby producing coarse sprays of large volumes of water which absorb air from the atmosphere before falling back into the body of water. In some case, such paddlewheel aerators are mounted on floats or rafts, and in other cases they are otherwise supported.

Although paddlewheel aerator mechanisms are not complex, the demands on them are substantial as they are normally employed almost continuously and are subjected to environmental extremes of wind and weather. In addition, the motor and drive mechanism for such devices are exposed to some extent to the spray which it creates.

A common approach to providing such aerators has been to provide a motor or engine (preferably an electric motor for unattended operation) secured on a platform adjacent the paddlewheel rotor mounting structure and coupled to the paddlewheel shaft with a reduction gear drive mechanism. Readily available motor speeds (RPM) are much higher than that required for the large paddlewheel, necessitating a speed reduction mechanism.

Since the frame structure involved is large and may be ten to twenty feet long, it is impossible to prevent some flexing of the structure in the environment to which it is subjected, and thus it has been desirable to also include some sort of flexible coupling in the drive path between the reduction gear drive mechanism and the paddlewheel rotor. Such reduction gear drives and flexible coupling arrangements have been found to be undesirable from the point of view of durability and longevity under exposure to water spray and other environmental conditions.

The present invention takes a different approach to the weather and water resistant motor drive and speed reduction problem by the use of a large rugged chain reduction drive mechanism enclosed in a substantially weatherproof and waterproof chain drive box assembly. On one vertical side of the box is mounted an electric motor with output shaft extending into the box, and on an opposite side are mounted the bearing and seal plate for the end of the main shaft of the paddlewheel rotor, which shaft also extends into the box. A two (or more) stage chain drive reduction mechanism mounted in the box couples the motor shaft to drive the paddlewheel rotor at a fixed speed of rotation twenty to one hundred times less than the motor speed. The chain drive box assembly is preferably constructed of structural steel plate up to ¼ inch thick for substantially rigidly supporting the motor shaft and the paddlewheel rotor bearing, nevertheless the box and frame structure are not totally inflexible and the motor shaft and the paddlewheel rotor shaft will not be maintained precisely parallel and may be deflected out of parallel by as much as one degree or more. It is the nature of a chain drive, however, that modest departures from parallelism between the chain drive shafts can be tolerated without substantial adverse consequences. Accordingly, no flexible coupling external to the chain drive box assembly is needed because the chain drive box assembly, in effect, provides all the flexible coupling that is required.

As a result, the structure of the present invention provides a paddle wheel aerator drive with a mechanism which is very rugged and durable and capable of long continuous operation under adverse conditions without maintenance or repair. At the same time, it is relatively easy to remove the water tight cover on the drive box assembly and access the chain drive mechanism whenever maintenance or repair is required.

In addition to providing the features and advantages described above, it is an object of the present invention to provide a paddlewheel aerator with a drive mechanism including a weatherproof electric motor and a speed reduction chain drive which is sealed in a substantially water tight box whereby there are no gear reduction mechanisms or flexible couplers exposed to the elements and to the spray generated by the paddlewheel aerator.

It is another object of the present invention to provide an enclosed chain drive and speed reduction mechanism for interposition between the motor or engine of a paddlewheel aerator and the paddlewheel main shaft, which enclosure is provided with substantially water tight seals, and wherein the chain drive mechanism includes two or more stages providing at least about twenty to one shaft speed reduction between the motor and the paddlewheel rotor shaft.

It is yet another object of the present invention to provide a paddlewheel aerator drive mechanism having two chain drive belts and associated sprockets together with an intermediate shaft for a large and small sprocket mounted substantially parallel to the shafts for the motor and the paddlewheel rotor.

Other objects and advantages of the invention will be apparent from consideration of the following description in conjunction with the appended drawings in which.

Figure 1:
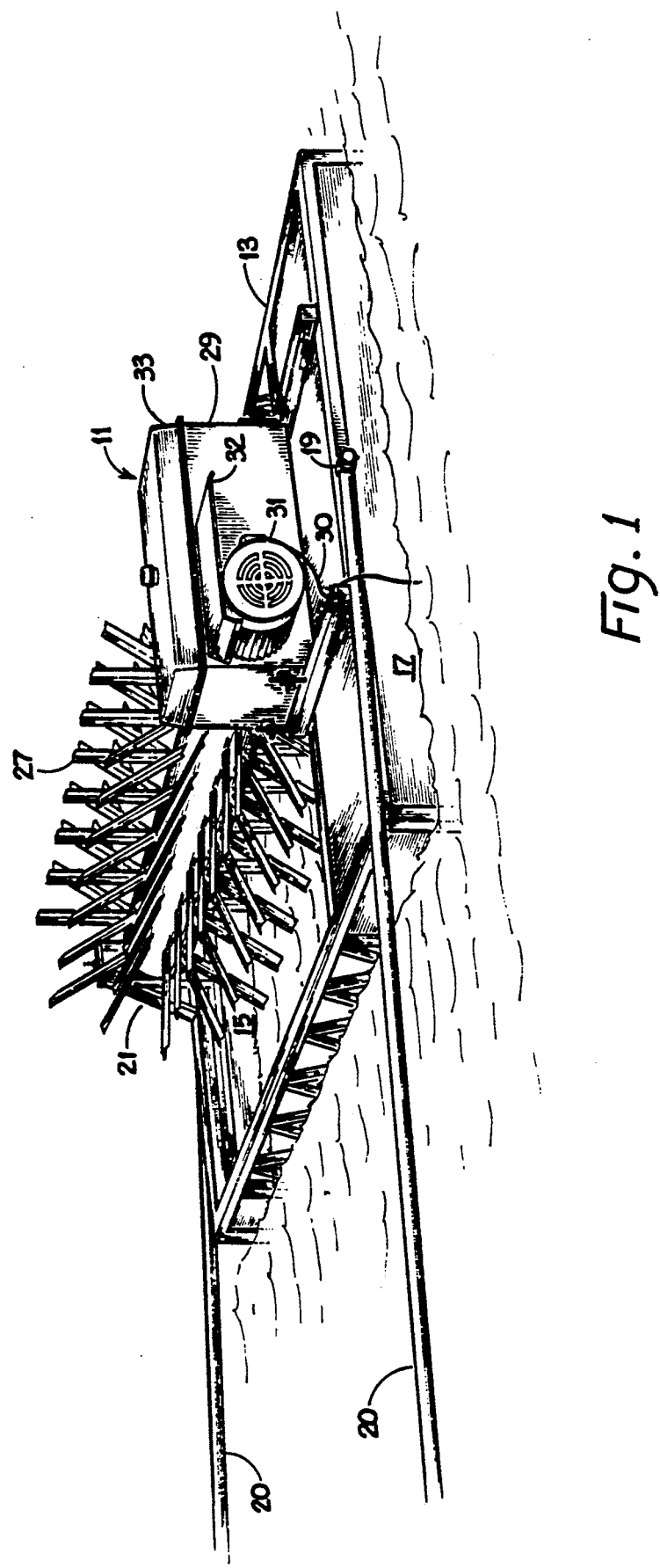
FIG. 1 is a perspective view of a paddlewheel aerator having a drive mechanism incorporating the present invention.
Figure 2:
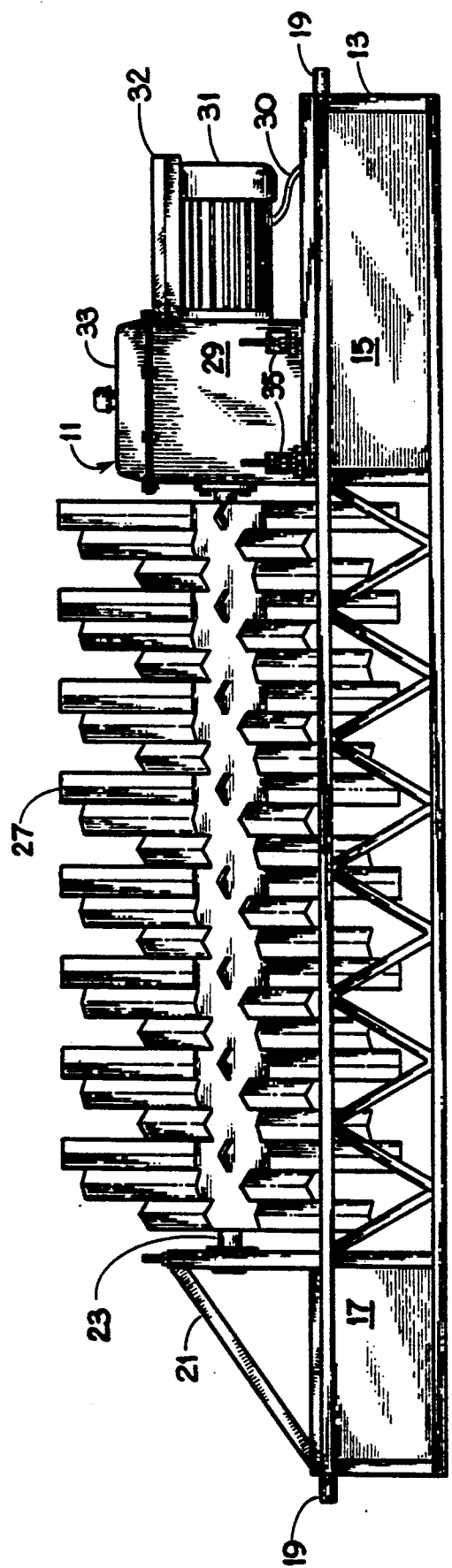
FIG. 2 is a side elevational view thereof.

Referring now to the drawings, and particularly FIGS. 1 and 2, a paddlewheel aerator 11 is shown having a frame 13 to which are attached suitable pontoons or floats 15 and 17. The floats 15 and 17 may be low density plastic foam such as polystyrene or may be hollow bodies of metal or plastic.

The end of the frame is provided with frame pivots 19, to which are attached restraining arms 20, the opposite ends of arms 20 being anchored at the shore, or on pilings in order to maintain paddlewheel aerator 11 in a stationary position.

A tail bearing and take-up frame 21 is provided to support one end of paddlewheel rotor main shaft 23. Paddlewheel rotor 27, consisting of a multiplicity of paddles extending below the water line on frame 13, is rotatably mounted on main shaft 23. The rotor 27 is preferably at least four feet long and may be on the order of ten to twenty feet in length. The other end of shaft 23 extends into a drive box 29 where it is rotatably supported in bearing 73 as may be seen in FIG. 3. Drive box 26 is secured and positioned on frame 13 by screw-adjustable mounting brackets 35, which aid in alignment of drive box 29 and bearing 73 with the axis of main shaft 23.

Figure 3:
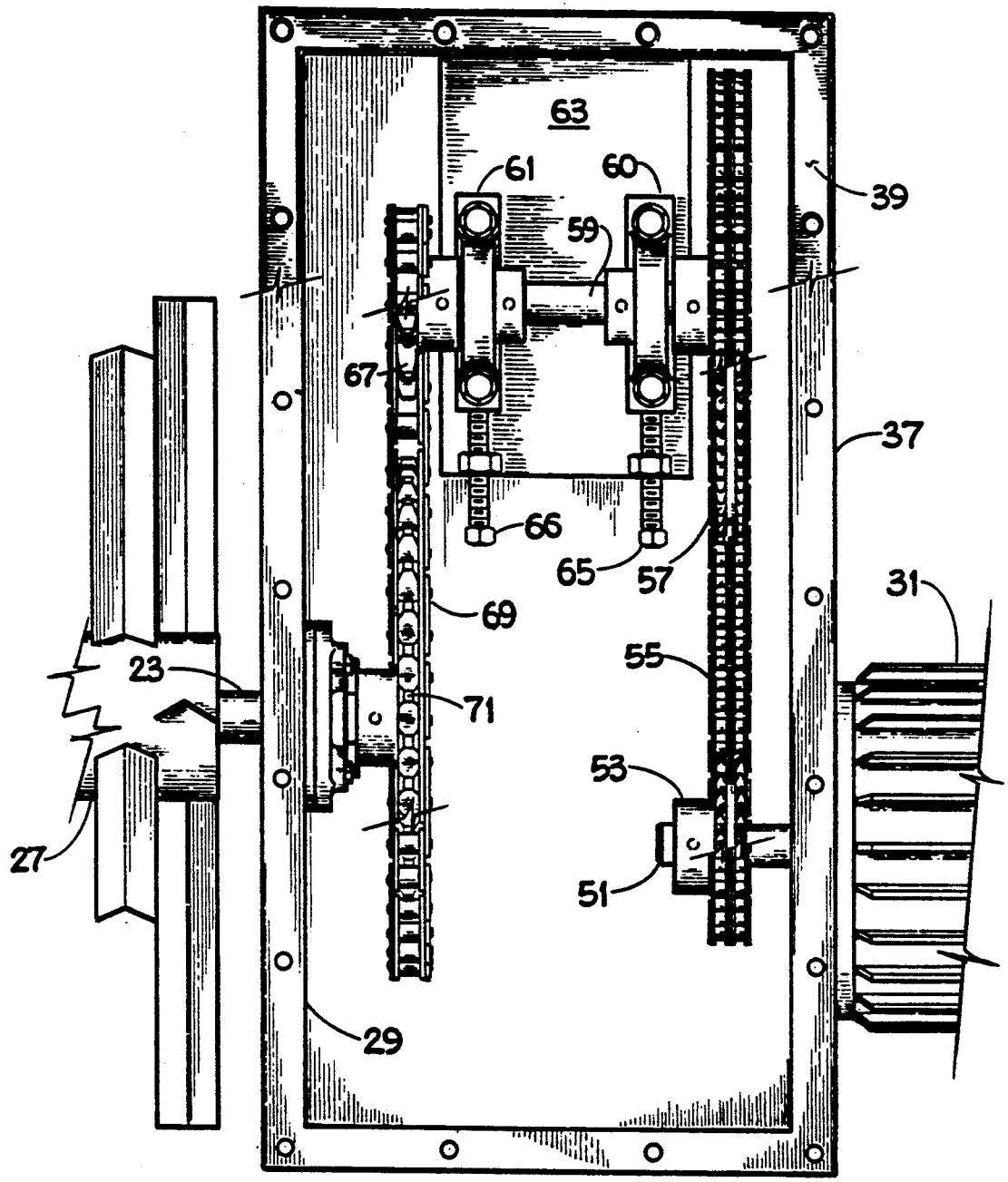
FIG. 3 is a fragmentary top plan view of the chain drive box assembly for the paddlewheel aerator with the cover removed.

Secured on the side of drive box 29 opposite paddlewheel rotor 27 is an electric motor 31 with its shaft 51 extending into drive box 29 as seen in FIG. 3. Electric cable 30 supplies electricity to motor 31 from a source on shore. A water shield 32 is provided extending from drive box 29 to reduce the exposure of motor 31 to the water spray thrown up by paddlewheel 27. Nevertheless, motor 31 is preferably a conventional weatherproof motor capable of operating under extremely adverse conditions.

Drive box 29 is provided with a removable cover 33 and with adjustable mounting fixtures 35 which facilitate proper alignment of drive box 29 with paddlewheel rotor shaft 23.

Figure 4:
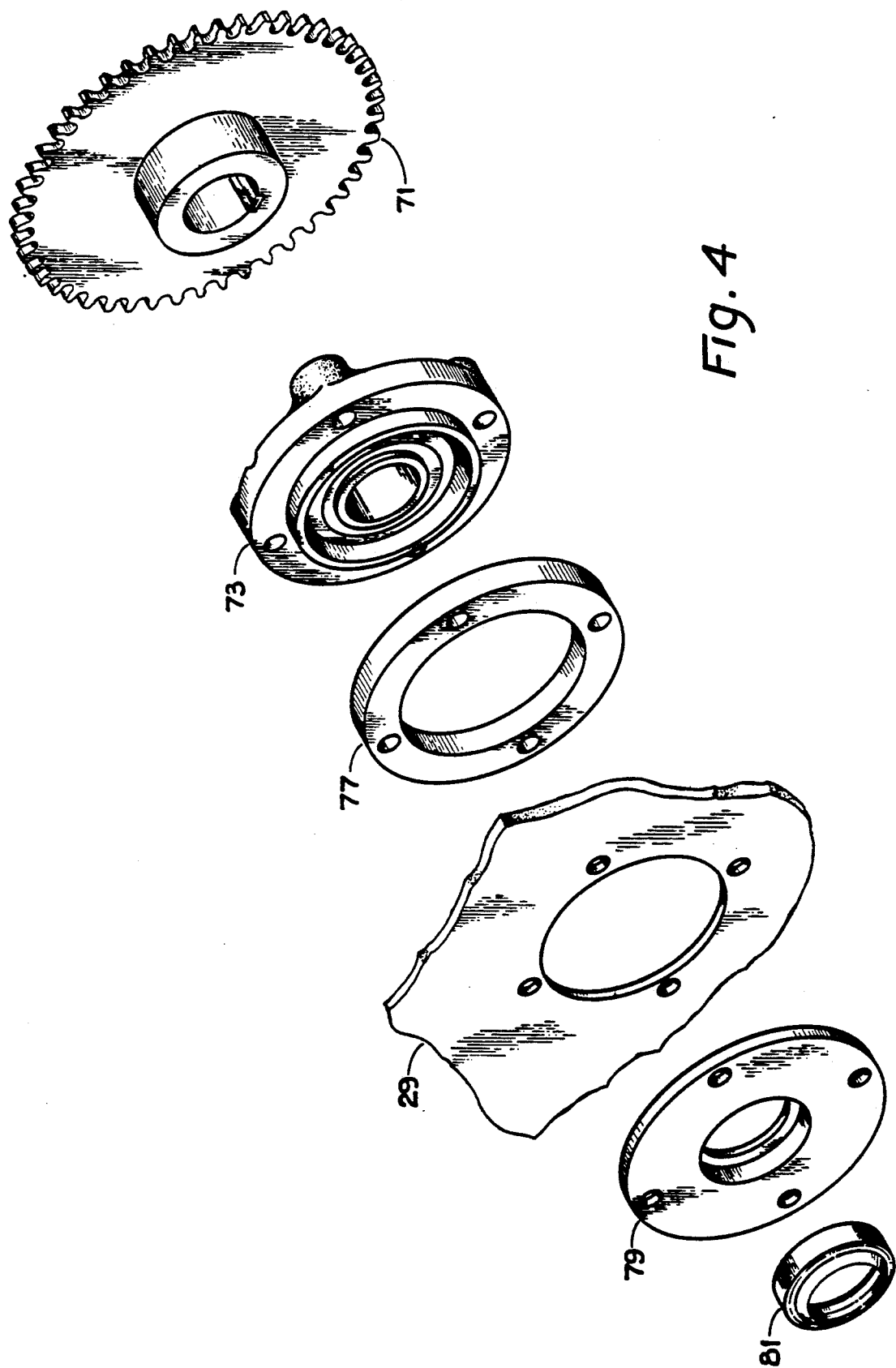
FIG. 4 is an exploded enlarged detail view of the paddlewheel rotor main shaft sprocket and associated bearing and seal means therefor.

Referring particularly to FIGS. 3 and 4, drive box 29 is provided with a flange 37 and a seal gasket 39 so that box 29 will be substantially water tight when cover 33 is secured thereon.

Shaft 51 of motor 31 extends into the interior of drive box 29, and motor 31 is mounted in a manner to seal the opening and preserve the water tight characteristic of drive box 29. Mounted on shaft 51 is a small sprocket 53.

The drive box assembly includes an intermediate shaft 59 mounted in bearings 61 and 60 which are in turn mounted on a bearing take-up pedestal 63. Large sprocket 57 and small sprocket 67 are mounted on respective ends of shaft 59, and all three elements are fixed to rotate together. Adjustment screws 65 and 66 are provided to adjust the position of bearings 60 and 61 and shaft 59. Sprocket 57 is driven through conventional drive chain belts 55 by sprocket 53 with a substantial reduction of at least 1:4 in speed which preferably may be on the order of 1:6. Sprockets 53 and 57 are shown as double sprockets by way of illustration but a greater or lesser number of parallel sprockets and chains may be employed as circumstances may require. Furthermore, link chains and sprockets as shown may be replaced by toothed endless belts and cog pulleys if desired. "Sprocket" and "chain belt" will be understood to include these and other equivalent positive belt drive mechanisms.

Mounted on the end of paddlewheel rotor shaft 23 is a large sprocket 71 which is driven from sprocket 67 through a conventional drive chain 69, and produced a further reduction in speed which may be on the order of 1:4. The speed reduction provided by the entire drive box assembly may vary depending upon the motor speed, the desired speed of paddlewheel rotor 27, or other factors and in general may range from 20:1 to 100:1.

In the present example, motor 31 is a single phase 220 volt ac electric motor, but other types of motors such as multi-phase motors or higher or lower voltage motors may be employed as circumstances may indicate.

As best seen in FIG. 4, an opening is provided for rotor shaft 23 in drive box 29 and mounted on the inside thereof is a bearing and bearing carrier 73 spaced from the wall of drive box 29 by optional spacer 77. Outside the drive box 29 is a seal plate 79 having a seal ring 81 of conventional form providing a water tight fitting around rotor shaft 23. Bearing carrier and bearing 73, spacer 77, and seal plate 79 are secured to the wall of drive box 29 by conventional through bolts (not shown in FIG. 4).

As previously explained, the rotational torque of motor 31 is transferred and amplified by the speed reducing chain drive including sprockets 53, 57, 67 and 71, and drive chains 55 and 69. Drive box 29 is constructed of heavy steel plate, and the rigidity thereof assures that shaft 51 and rotor shaft 23 remain fixed and nearly parallel. Any slight deviation from parallel between shafts 23 and 51 is accommodated by the inherent tolerance of the chain drive for such deviations. If desired, idler sprockets could be employed between sprocket 53 and sprocket 57, or between sprocket 67 and sprocket 71, but this has not been found to be necessary. The need for flexibility of a chain belt drive is less severe between motor 31 and intermediate shaft 59 and a gear drive or other speed reducing drive could be employed there.

The chain drive box assembly according to the invention may be employed with a wide variety of aerators not limited to the form shown herein for illustration. Furthermore, the electric drive motor 31 could in some instances be replaced by an internal combustion engine fueled with liquid or gaseous fuel. Other variations and modifications in addition to those shown or suggested will be apparent to those of skill in the art and accordingly the scope of the invention is not to be considered as limited to those variations and modifications suggested or described, but is rather to be determined by reference to the appended claims.

What is claimed is:

1. A paddlewheel aerator comprising
a frame,
a watertight drive box secured on said frame having a removable cover and a substantially water tight seal means for preventing ingress of water to
the interior of said drive box,
a motor adjacent said drive box having a shaft extending into said box,
an intermediate shaft mounted with said drive box in bearings fixed relative to said frame and on about the same vertical level as, and parallel to, said motor shaft,
speed reduction drive means connected to drive said intermediate shaft from said motor shaft,
a paddlewheel having radially extending paddles rotatably mounted on said frame and having a main shaft extending through an opening in a side of said drive box opposite said motor, the nearest of said paddles being horizontally displaced from said motor by at least the width of said drive box and said main shaft being on about the same vertical level as said motor shaft,
means for providing a water tight seal for said opening and main shaft,
a drive sprocket secured to rotate with said intermediate shaft,
a driven sprocket secured to rotate with said main shaft and having a diameter greater than that of said drive sprocket and,
a chain belt mounted to drive said driven sprocket from said drive sprocket.

2. Apparatus as recited in claim 1 wherein said speed reduction drive means comprises a sprocket fixedly mounted to rotate with said motor shaft, a relatively large sprocket fixedly mounted to said intermediate shaft, and a chain belt coupling said motor shaft sprocket and said relatively larger sprocket.

3. Apparatus as recited in claim 1 wherein said motor shaft, said intermediate shaft and said main shaft are substantially parallel to one another.

4. Apparatus as recited in claim 1 wherein said main shaft is rotatably mounted on said frame as its end distant from said motor in a fixed bearing spaced at least four feet from said drive box.

5. In a paddlewheel aerator having a frame, float elements secured to said frame, and a paddlewheel having a main shaft, rotatably mounted on said frame a chain drive box comprising
- a watertight box with a removable side and a substantially watertight seal means for preventing ingress of water to the interior of said drive box secured on top of said frame,
- a motor fixedly secured at the outside of said drive box having a shaft extending into said box through a sealed opening in one side thereof,
- an intermediate shaft mounted in bearings within said drive box fixed relative to said frame and on about the same vertical level as, and parallel to, said motor shaft,
- speed reduction drive means connected to drive said intermediate shaft from said motor shaft at a rotational speed less than that of said motor,
- an opening in a side of said drive box opposite said motor on about the same vertical level as said motor shaft through which said main shaft extends,
- means for providing a water tight seal for said opening and main shaft,
- a drive sprocket secured to rotate with said intermediate shaft,
- a driven sprocket secured to rotate with said main shaft and having a diameter greater than that of said drive sprocket, and
- a chain belt mounted to drive said driven sprocket from said drive sprocket.

6. Apparatus as recited in claim 5 wherein said speed reduction drive means comprises an output shaft sprocket fixedly mounted to rotate with said motor shaft, a relatively larger sprocket fixedly mounted to said intermediate shaft, and a chain belt coupling said motor shaft sprocket and said relatively larger sprocket.

7. Apparatus as recited in claim 5 wherein said motor shaft, said intermediate shaft and said main shaft are substantially parallel to one another.

8. Apparatus as recited in claim 5 wherein said main shaft is mounted on said frame at its end distant from said motor in a fixed bearing spaced at least four feet from said drive box.

9. A paddlewheel aerator comprising
- a frame,
- float elements secured to said frame,
- a watertight drive box secured on top of said frame,
- a constant speed motor fixedly secured adjacent said drive box having a power output shaft extending into said box through a sealed opening in one side thereof,
- an intermediate shaft mounted in bearings within said drive box fixed relative to said frame and on about the same vertical level as, and parallel to, said power output shaft,
- a speed reduction drive means including an output shaft sprocket fixedly mounted to rotate with said output shaft, a sprocket relatively larger than said output shaft sprocket fixedly mounted to said intermediate shaft, and a chain belt coupling said output shaft sprocket and said relatively larger sprocket,
- a paddlewheel rotatably mounted on said frame and having a main shaft parallel to said intermediate shaft extending through an opening in a side of said drive box opposite said motor on about the same vertical level as said output shaft,
- means for providing a water tight seal for said opening and main shaft,
- a drive sprocket secured to rotate with said intermediate shaft,
- a driven sprocket secured to rotate with said main shaft and having a diameter at least four times that of said drive sprocket,
- a chain belt mounted to drive said driven sprocket from said drive sprocket, and
- a removable cover for said drive box with a substantially water tight seal means for preventing ingress of water to the interior of said drive box.

10. Apparatus as recited in claim 9 wherein said main shaft is mounted on said frame at its end distant from said motor in a fixed bearing spaced at least four feet from said drive box.

* * * * *

UNITED STATES PATENT AND TRADEMARK OFFICE
CERTIFICATE OF CORRECTION

PATENT NO. : 5,116,501

DATED : May 26, 1992

INVENTOR(S) : Barry L. House

It is certified that error appears in the above-identified patent and that said Letters Patent is hereby corrected as shown below:

Column 5, line 12 (Claim 5) after "watertight" insert --drive--.

Signed and Sealed this

Fifth Day of October, 1993

*Attest:*

BRUCE LEHMAN

*Attesting Officer*   *Commissioner of Patents and Trademarks*